(12) United States Patent
Hartmann

(10) Patent No.: US 9,858,505 B2
(45) Date of Patent: Jan. 2, 2018

(54) IDENTIFICATION OF PACKING UNITS

(71) Applicant: Bernd Hartmann, Grafschaft (DE)

(72) Inventor: Bernd Hartmann, Grafschaft (DE)

(73) Assignee: Deutsche PostAG, Bonn (DE)

( * ) Notice: Subject to any disclaimer, the term of this patent is extended or adjusted under 35 U.S.C. 154(b) by 139 days.

(21) Appl. No.: 14/804,971

(22) Filed: Jul. 21, 2015

(65) Prior Publication Data

US 2015/0324665 A1    Nov. 12, 2015

Related U.S. Application Data

(63) Continuation of application No. PCT/EP2013/056046, filed on Mar. 22, 2013.

(51) Int. Cl.
| | | |
|---|---|---|
| *G06T 7/00* | (2017.01) | |
| *G06K 9/68* | (2006.01) | |
| *G06F 17/27* | (2006.01) | |
| *B07C 3/14* | (2006.01) | |

(52) U.S. Cl.
CPC ......... *G06K 9/6821* (2013.01); *G06F 17/275* (2013.01); *G06F 17/2765* (2013.01); *B07C 3/14* (2013.01)

(58) Field of Classification Search
None
See application file for complete search history.

(56) References Cited

U.S. PATENT DOCUMENTS

| | | | | |
|---|---|---|---|---|
| 6,272,456 B1* | 8/2001 | de Campos | ........... | G06F 17/275 704/8 |
| 6,778,683 B1* | 8/2004 | Bonner | ............. | G06K 9/00973 209/584 |
| 7,031,519 B2* | 4/2006 | Elmenhurst | ............. | G06K 9/03 382/101 |
| 7,415,171 B2* | 8/2008 | Snapp | .................... | G06K 9/723 382/311 |

(Continued)

FOREIGN PATENT DOCUMENTS

| | | |
|---|---|---|
| DE | 101 26 835 A1 | 12/2002 |
| EP | 0 589 118 A1 | 3/1994 |

(Continued)

OTHER PUBLICATIONS

Brakensiek, Anja, Rigoll, Gerhard. "Handwritten Address Recognition Using Hidden Markov Models" Adaptive READ Research Project, LNCS 2956, pp. 103-122, 2004.*

(Continued)

*Primary Examiner* — Kim Vu
*Assistant Examiner* — Molly Delaney
(74) *Attorney, Agent, or Firm* — Reinhart Boerner Van Deuren P.C.

(57) ABSTRACT

For an identification of packing units, data resulting from an optical recording of at least one surface of a packing unit undergo a text recognition to recognize individual characters. A plurality of characteristic values is determined, each characteristic value being based on another predetermined statistical analysis of the recognized characters. The plural- (Continued)

ity of characteristic values forms at least one part of an identification of the packing unit. The characteristic values are provided for storage and/or for comparison with previously stored characteristic values.

19 Claims, 4 Drawing Sheets

(56) References Cited

U.S. PATENT DOCUMENTS

| | | | |
|---|---|---|---|
| 2004/0064351 A1 | 4/2004 | Mikurak | |
| 2004/0117192 A1* | 6/2004 | Miletzki | B07C 3/14 704/277 |
| 2005/0004877 A1* | 1/2005 | McLellan | G06Q 10/047 705/400 |
| 2006/0245641 A1* | 11/2006 | Viola | G06F 17/2715 382/155 |
| 2011/0098846 A1 | 4/2011 | Yeung et al. | |
| 2012/0106787 A1* | 5/2012 | Nechiporenko | G06K 9/00 382/103 |

FOREIGN PATENT DOCUMENTS

| | | |
|---|---|---|
| EP | 0 621 542 A2 | 10/1994 |
| WO | WO 2012/060928 A1 | 5/2012 |

OTHER PUBLICATIONS

Ehlker, Automation for post, courier, express and parcel services, SILOG News, newsletter, 2011, 8 pages, Siemens AG, Konstanz, Germany.

* cited by examiner

IDENTIFICATION OF PACKING UNITS

CROSS-REFERENCE TO RELATED PATENT APPLICATION

This patent application is a continuation of PCT/EP2013/056046, filed Mar. 22, 2013, the entire teachings and disclosure of which are incorporated herein by reference thereto.

FIELD OF THE INVENTION

The present invention relates inter alia to a method, an apparatus, a system, a program and a storage medium for identifying packing units.

BACKGROUND OF THE INVENTION

A packing unit can be, for example, a letter, a small parcel, a packet or any other shipment to be transported by a logistics service provider. The increasing individualization of services associated with the transportation of packing units demands flexible skills with regard to delivery and collection. The possibility of identifying packing units can facilitate the delivery of required services. These can be services which are required by a sender and/or by a recipient. Therefore, the identification of packing units plays a key role in logistics.

Nowadays, packing units are usually identified by barcodes which are detected by a scanner or a camera.

GENERAL DESCRIPTION OF SOME EXEMPLARY EMBODIMENTS OF THE INVENTION

The invention is based on the consideration that the application of barcodes requires an additional working step and that, in order to be analyzed reliably, the application of the barcodes to a packing unit has to be of a satisfactory quality. The invention is based on the further consideration that barcodes are not standardized world-wide. They can differ from one logistics service provider to another and/or from one country to another. International services in particular can also be complicated thereby.

The object of the invention is to provide another identification option for packing units.

The object is achieved by a method according to claim 1, by an apparatus according to claim 9, by a system according to claim 11, by a program according to claim 12 and by a storage medium according to claim 13. Further embodiments are set out in the dependent claims.

An exemplary method according to the invention, performed by at least one apparatus, comprises obtaining data resulting from an optical detection of at least one surface of a packing unit, carrying out a text recognition based on the obtained data to recognize individual characters, determining a plurality of characteristic values as at least one part of an identification of the packing unit, each characteristic value being based on another predetermined statistical analysis of the recognized characters, and providing the characteristic values for the storage thereof and/or for the comparison thereof with previously stored characteristic values.

An exemplary apparatus according to the invention comprises means for performing the method according to the invention. The apparatus can be a mobile device or a stationary device. It can be, for example, part of an installation, a locally used computer or a server. The apparatus can also be a module for a device.

An exemplary apparatus according to the invention comprises at least one processor and at least one memory, a program comprising program instructions being stored in the memory, and the memory and the program being configured, with the processor to cause the apparatus at least to perform the method according to the invention when the program is executed on the processor. The apparatus is configured in terms of software, for example, to be capable of performing the method. In this respect, "configured in terms of software" is to be understood in particular as the preparation of the apparatus which is necessary to be able to implement a method, for example in the form of a program, on the processor.

A processor can be understood, inter alia, as one or more control units, microprocessors, micro control units such as microcontrollers, digital signal processors (DSP), application-specific integrated circuits (ASIC) or field programmable gate arrays (FPGA).

A memory is for example a program memory and/or a main memory which the processor can access. A program memory is to be understood as, inter alia, a non-volatile memory and a main memory is to be understood as a volatile or a non-volatile memory, in particular a memory with random access (RAM) and/or a flash memory. Non-volatile memories are, for example memories with random access (RAM) such as NOR flash memories or with sequential access, such as NAND flash memories and/or memories with read-only access (ROM) such as EPROM, EEPROM or ROM memories. The memory can be configured as a physical object, for example.

An exemplary system according to the invention comprises at least one apparatus according to the invention and at least one scanner for optically recording a surface of packing units and/or at least one camera for optically recording a surface of packing units. The system can also comprise a memory in which determined characteristic values are stored. The memory can be, for example, part of a server or can be addressed by a server.

An exemplary program according to the invention comprises program instructions, said program instructions causing an apparatus to perform the method according to the invention if the program is executed by the processor. A program can be distributed, for example, via a network such as a local network, a wide area network, a virtual network, a radio network such as a mobile radio network, another telephone network and/or by the Internet. A program can be at least partly software and/or firmware of a processor. The program according to the invention can be stored, for example, in a memory of the apparatus according to the invention. It is understood that the term "program" can also be respectively understood as a combination of a plurality of programs.

An exemplary storage medium according to the invention stores the program according to the invention. The storage medium is, for example, a computer-readable storage medium which contains the program according to the invention and is configured, for example, as a magnetic, electric, electromagnetic, optical and/or a different storage medium. The storage medium can be in particular a physical and/or physically implemented storage medium. The storage medium is for example portable or is fixedly installed in an apparatus. "Computer-readable" is to be understood in particular as meaning that the storage medium can be read (out) and/or written to by a computer or by a data processing apparatus, for example by a processor. The storage medium is, for example, a program memory of a processor.

Packing units are distinguished from one another by written, customer-based information such as sender, recipient and by further labels on the packing unit. The writing which is used is composed of different characters.

Therefore, for particular exemplary embodiments, the invention provides that text on a packing unit is optically detected, recognized and statistically analyzed. A plurality of characteristics of the text is determined. Each characteristic value is based on another statistical analysis of the recognized characters of the text. The statistical analyses can be predetermined such that different texts generally result in different characteristic values. The characteristic values for a packing unit as a whole thus allow the packing unit to be distinguished at least from many other packing units. The characteristic values as a whole can be used at least as part of an identification for a packing unit. The characteristic values can be provided for storing. Alternatively or in addition, the characteristic values can be provided for comparison with previously stored characteristic values.

A possible advantage of the invention is that an alternative or addition to an identification of packing units by barcodes is provided. This allows a flexible handling of packing units which does not depend on specific logistics service providers. A further possible advantage of the invention is that by analyzing the text on a packing unit, changes in this text over time can also be detected. Compared to the use of all of the data from an optical recording of a surface or from a text recognition for an identification, the use of characteristic values which are based on statistical analyses of text on packing units allows an identification using a relatively small amount of data. A small amount of data requires relatively little storage space and allows a relatively fast comparison of newly acquired data with stored data. In turn, this reduces the need for processor power and energy.

A character can be any independent part of a text, such as a character of different alphabets, a numerical character of different numerical systems, a punctuation mark including special characters, a syllable of a syllabary or a logogram, etc.

In an exemplary embodiment, the at least one of the statistical analyses includes a determination of a frequency of a particular character, a determination of a frequency of a particular combination of characters, and/or a determination of a frequency of a particular character at a particular position. Other statistical analyses are also possible. In this respect, the frequency can be an absolute frequency or a relative frequency. The relative frequency can be, for example, a number in relation to the number of all recognized characters or of specific recognized characters. In a statistical analysis, a determined relative frequency can also be related to a relative frequency which is to be expected. The result could then be used as a characteristic value.

The predetermined statistical analyses of the recognized characters can be selected, for example, such that the resulting characteristic values are particularly suitable for distinguishing texts on packing units from one another.

For this purpose, in an exemplary embodiment, at least one of the predetermined statistical analyses of the recognized characters is selected based on at least one of the following criteria: a probability of occurrence of a particular character, a probability of occurrence of a particular combination of characters, and a probability of occurrence of a particular character at a particular position.

The respective probability could be determined, for example, using statistical analyses of a particular language or of a particular group of languages. However, it could also be determined using statistical analyses of selected fields of a language or of a language group, for example based on an extensive, representative number of names and addresses. If a particular character or a particular character combination appears very seldom and thus with low probability, for example the character combination "xq" in German, a characteristic value indicating the frequency of this character combination would not be very suitable for distinguishing packing units from one another, as in this case a characteristic value of "zero" would be determined for practically every packing unit. On the other hand, if a particular character or a particular character combination appears with a very high probability, such as "e" in German, a packing unit can already be distinguished from a large number of other packing units by the frequency of this character in a recognized text on said packing unit.

Therefore, in exemplary embodiments, one of the statistical analyses of the recognized characters can be selected such that the frequency of a particular character which appears with a particularly high probability is determined as a characteristic value. Alternatively or in addition, accordingly in exemplary embodiments, one of the statistical analyses of the recognized characters can be selected such that the frequency of a particular character combination or of a particular character position etc. which occurs with a particularly high probability is determined.

The statistical relations between the characters of a text vary depending on the cultural area. These specific relations can be used to contribute to the identification of packing units as selective characteristic carriers.

In an exemplary embodiment, different statistical analyses of recognized characters are therefore predetermined for different languages or language groups, the predetermined statistical analyses of recognized characters being selected for a respective language or language group based on statistical analyses of the language or language group. The plurality of characteristic values can then be determined based in each case on statistical analyses of the recognized characters which have been predetermined for a particular language or language group.

This can provide the advantage that for an extensive identification of a packing unit, a smaller number of characteristics can be used than with a plurality of characteristics for many languages. Thus for example, no Japanese syllable characters appear in scripts with Latin characters, and the consideration of statistical analyses with respect to Japanese syllable characters would play no part in distinguishing packing units provided with Latin writing.

In an exemplary embodiment, a separate additional characteristic value could be provided to indicate the respectively considered language or language group.

The language or language group to be considered can be fixedly predetermined, individually predetermined or determined within the scope of the method according to the invention. In an exemplary embodiment, the language is determined based on a geometric distribution of particular recognised characters. Thus for example, the arrangement of numbers at a particular position, such as a post code or a house number, can provide an indication of the language. In another exemplary embodiment, the language is additionally or alternatively determined based on the presence of particular characters. Particular characters only occur in particular languages. In a further exemplary embodiment, the language is additionally or alternatively determined based on information about the place of origin of the packing unit.

If information about the language has already been provided before the text is recognized, then this information can also be used for carrying out the text recognition.

In an exemplary embodiment, the method comprises the preceding optical recording of the at least one surface of the packing unit.

In an exemplary embodiment, the optical recording comprises scanning the at least one surface of the packing unit or comprises photographing the at least one surface of the packing unit. In this respect, the optical recording can be carried out by the same apparatus which determines the characteristic values or it can be carried out by a different apparatus.

In an exemplary embodiment, the method comprises comparing the determined characteristic values with previously stored characteristic values. For the comparison, determined characteristic values can be correlated with stored characteristic values to establish a match and/or differences. The comparison can be carried out by the same apparatus which determines the characteristic values or it can be carried out by a different apparatus.

A match of the current characteristic values with stored characteristic values is an indication that a present packing unit is the same as a packing unit which was detected at an earlier time, for which characteristic values were generated and stored. A slight discrepancy in the current characteristic values compared to stored characteristic values is an indication that the present packing unit is the same as a packing unit which was detected at an earlier time, although in the meantime an alteration to or manipulation of the lettering may have taken place. A result of this type can therefore prompt further automatic or manual investigations.

Characteristic values which have been generated for a packing unit can be stored in the apparatus which determines the characteristic values. In addition or alternatively, they can also be stored in another apparatus.

In an exemplary embodiment, the apparatus according to the invention comprises at least one processor and/or at least one memory and/or at least one interface for data communication and/or at least one scanner and/or at least one camera. The at least one memory can be used to store programs, parts of programs, interim results, characteristic values and/or other data. A scanner or a camera can be used for optically capturing the at least one surface of the packing unit. If the apparatus itself does not comprise a camera or a scanner, an interface for data communication can be used to receive data from a camera or a scanner. An interface for data communication can furthermore be used to transmit generated characteristic values and/or results of analyses based on the generated characteristic values to another apparatus. Such another apparatus can be a server, for example, which receives, stores and provides, as required, characteristic values from different apparatuses. An interface for data communication can be an interface for a wired connection or for a wireless connection. A wired connection can be, for example a direct connection to another apparatus, a connection into a local network (local area network, LAN), or a connection into a public network, such as the Internet. A wireless connection can be, for example, a connection into a local radio network (wireless local area network, WLAN), a direct wireless connection to another apparatus, such as a Bluetooth connection, or a connection into a mobile network. Further advantageous exemplary embodiments of the invention will be revealed from the following detailed description of some exemplary embodiments of the present invention, in particular in conjunction with the figures. However, the figures are only used for illustration purposes, not to define the scope of protection of the invention. The figures are not true to scale and are merely to reflect the general concept of the present invention by way of example. In particular, it should not be considered that features which are contained in the figures are mandatory components of the present invention.

DETAILED DESCRIPTION OF SOME EXEMPLARY EMBODIMENTS OF THE INVENTION

In the following, the present invention will be described with reference to exemplary embodiments.

Figure 1:
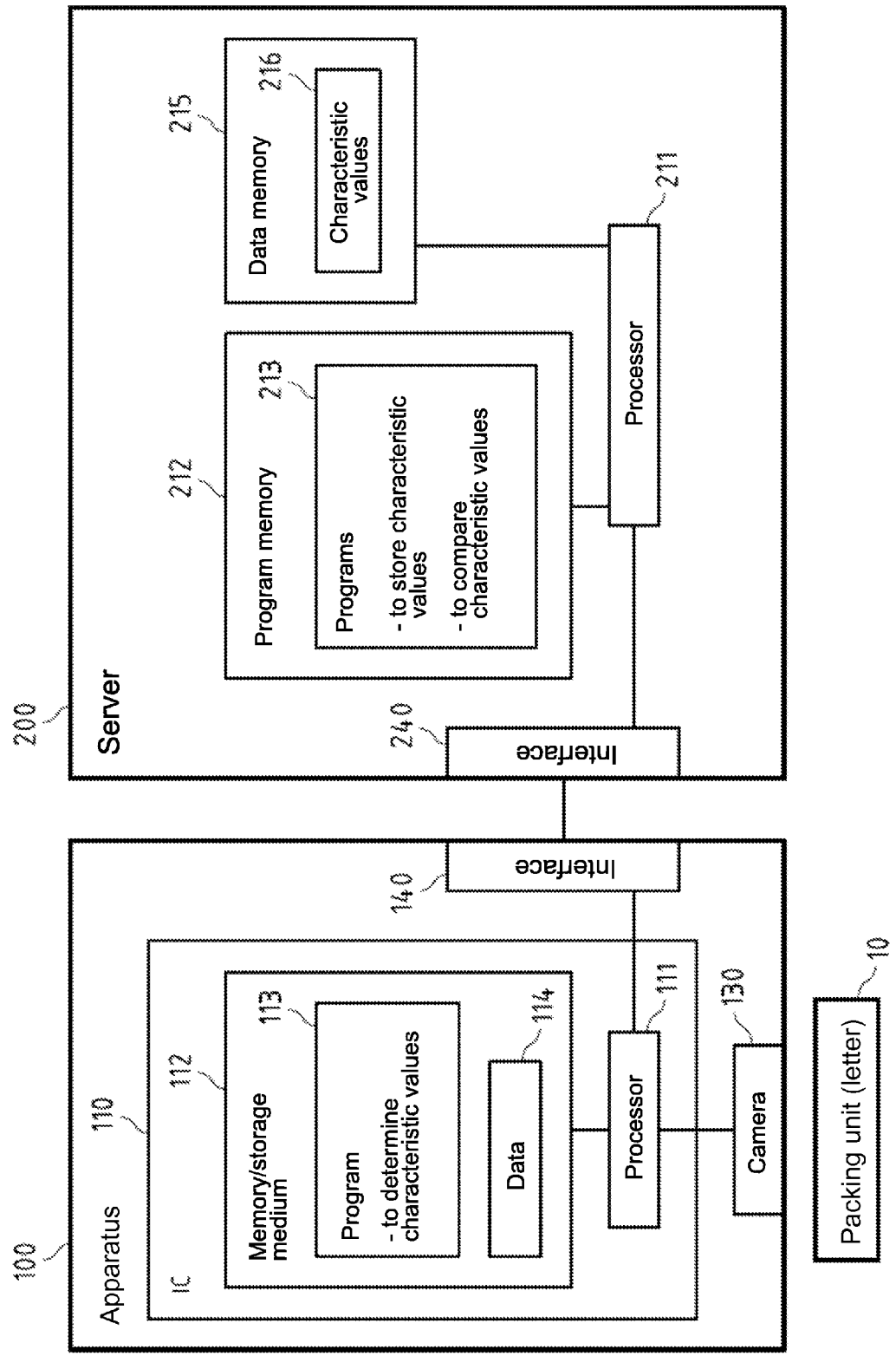
FIG. 1 is a block diagram of a first exemplary embodiment of a system according to the invention with a first exemplary embodiment of an apparatus according to the invention.

FIG. 1 is a block diagram of a first exemplary embodiment of a system according to the invention in which packing unit identifications are generated and used. It is assumed by way of example that the packing units are letters; however, other types of packing units could be identified in the same way.

The system comprises an exemplary embodiment of an apparatus 100 according to the invention and a server 200.

The apparatus 100 comprises a processor 111 and a memory 112 connected to the processor 111. The processor 111 could be a microprocessor. It could also be embedded in an integrated circuit (IC) 110, for example together with the memory 112. The memory 112 is or comprises a storage medium which stores a program 113 with program instructions. The processor 111 is configured to execute programs from the memory 112 and to thereby cause the apparatus 100 to perform particular actions. The program 113 is a program for determining characteristic values. Data 114 can also be stored in the memory 112. It is understood that the program 113 or parts of the program can also be temporarily stored in a main memory (not shown) during processing by the processor 111.

The apparatus 100 also comprises a digital camera 130. The camera 130 is also connected to the processor 111. The apparatus 100 can be fixedly installed, for example as part of a sorting installation. The camera 130 is then arranged such that it can photograph letters 10 passed under the apparatus. Alternatively, the apparatus can be mobile and portable. In this case, a user, for example a courier can respectively aim the camera 130 at a packing unit and initiate the photographing procedure manually. Instead of a camera, it is also possible to use a scanner which scans a letter.

The apparatus 100 further comprises an interface 140 for exchanging data with the server 200. The interface 140 is also connected to the processor 111. The interface 140 can be an interface for a line-bound connection or a wireless interface which is provided, for example, by a WLAN, Bluetooth or mobile radio module. The connection to the server 200 can optionally be at least partly realised by a public communications network, such as by a mobile network and/or by the Internet.

The apparatus 100 can comprise any other components. For example, it could have a user interface with a screen and a keyboard, etc.

The server 200 comprises a processor 211 and, connected to the processor 211, a program memory 212, a data memory 215 and an interface 240. The processor 211 could be a microprocessor. It could also be embedded in an integrated circuit, for example together with the program memory 212. The program memory 212 stores programs 213 with program instructions. The processor 210 is configured to execute programs from the program memory 212 and thereby to cause the server 200 to perform particular actions. The programs 213 include a program for storing characteristic values which have been obtained and a program for comparing obtained characteristic values and stored characteristic values. The data memory 215 stores characteristic values. The interface 240 allows data to be exchanged with other entities, such as with apparatus 100.

Figure 2:
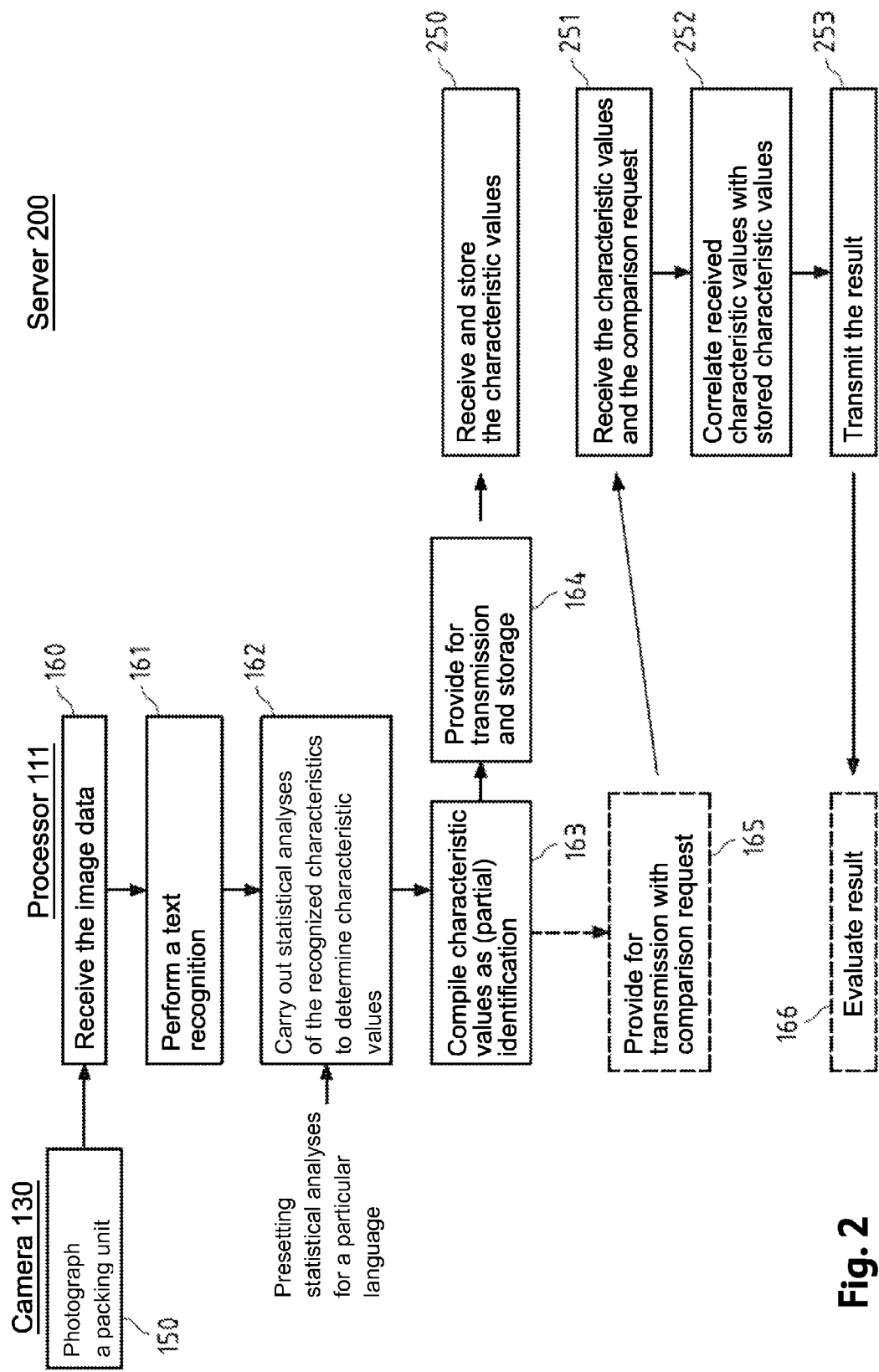
FIG. 2 is a flow chart with method steps of an exemplary embodiment of the method according to the invention.

FIG. 2 illustrates an operation of the system from FIG. 1 as an exemplary embodiment of a method according to the invention. The actions shown on the left-hand side are performed by the camera 130 of the apparatus 100. The actions shown in the middle are performed when the processor 111 of the apparatus 100 executes the program 113. The actions shown on the right-hand side are performed by the server 200 when the processor 211 executes one of the programs 213 from the program memory 212.

When a letter 10 is arranged in the recording region of the camera 130, the camera 130 photographs the letter 10 and thus optically captures the surface thereof (action 150). Photographing can be initiated automatically when a particular position of the letter 10 or of a carrier unit on which the letter 10 is conveyed is detected. However, photographing can also be initiated manually by a user. Each letter 10 could also be photographed twice, once on the front and once on the back. Each photographing procedure produces a set of image data.

The camera 130 transmits the image data to the processor 111. The processor 111 receives the data (action 160) and performs a pattern recognition which comprises at least one text recognition (action 161).

If text is not detected on either side of the letter, an error message could be output.

Otherwise, individual characters are now available as the result of the text recognition, which characters can include letters, numbers, punctuation marks, special characters and other characters.

The processor 111 subjects the detected characters to a number of statistical analyses (action 162). The type of analysis is predetermined. Each analysis produces a characteristic value. Some analyses can determine, for example, the absolute or relative frequency of a particular character or of a particular character combination. Thus, for a first characteristic value, it could be determined how often the letter "e" appears in the entire recognized text, and for a second characteristic value, how often the combination "st" appears in the entire recognized text, etc.

A respective characteristic value can optionally also be the ratio of a relative frequency of a character or of a character combination to the probability with which this character or this character combination appears. As a result, the values of different characteristics can be more similar among one another. This can make the results of a correlation discussed further below more significant.

Different statistical analyses can be predetermined for different languages. Consequently, for example the characters and/or character combinations which appear with a particularly high probability in a respective language can be considered.

The language to be considered can be preset in an apparatus 100 as a parameter. Thus, an apparatus 100 used in a particular country may respectively use the set of statistical analyses which is provided for the language of the country. Alternatively, an apparatus 100 can be arranged for example in a location of a sorting system, through which specifically the letters from a particular country of origin pass. In this case, the apparatus 100 can respectively use the set of statistical analyses which is provided for the language from the country of origin. However, using the text recognition, an apparatus 100 could itself also analyze which language is suggested by the structure of the recognized text. Thus, the arrangement of a post code and/or a house number in an address field could be indicative of a particular country and thereby of a particular language.

The processor 111 compiles the determined characteristic values for a letter 10, for example in the form of a characteristics vector (163). The characteristics vector can be an identification or a partial identification for the letter 10.

In a first variant, the processor 111 provides the compiled characteristic values for storage and causes the apparatus 100 to transmit the characteristic values via the interface 140 to the server 200 (action 164). It is understood that the processor 111 can also initially generate the characteristic values for a plurality of letters and store them in a memory of the apparatus 100. The characteristic values can then be transmitted to the server 200 in a bundle, for example once per hour.

The server 200 receives the characteristic values via the interface 240 and the processor 211 causes a storage of the characteristic values in the data memory 215, for example in the form of a characteristics vector or as elements of a table (action 250).

The server 200 can also receive characteristic values from other similar apparatuses and can store them in the data memory 215. Characteristic values can also be stored together with other information about a letter 10, such as the weight, size, address, service details, an intended transport chain, etc. Information of this type can be provided by the apparatus 100 or by other apparatuses. If the characteristic values are only intended as a partial identification, then a few additional items of information of this type, together with the characteristic values can form a compete identification for the letter 10.

In a second variant, the processor 111 causes the apparatus 100 to transmit to the server 200 the characteristic values together with a request to compare them with stored characteristic values (action 165). The apparatus 100 can have program instructions for implementing the second variant with actions 165 and 166 as an alternative or in addition to program instructions for implementing the first variant with action 164. Therefore, actions 165 and 166 are shown in dashed lines in FIG. 2.

The processor 211 of the server 200 receives the characteristic values and the request (action 251) and performs a correlation between the obtained set of characteristic values and all or selected sets of characteristic values stored in the data memory 215 (action 252). For this purpose, for example the difference between the obtained value and the stored value can be calculated for each characteristic. The differences for all the characteristics can then be added up, thereby producing a total value as the correlation value. Stored sets of characteristic values could be previously selected using available parameter values, for example using information about the weight of the letter for which the set of characteristic values was received.

The correlation value indicates whether there is an identical set of stored characteristic values or whether there is a set of characteristic values with minor differences. If there are differences above a predetermined correlation value, it can be assumed that the compared characteristic values are the characteristic values of different letters; and if there are differences below a predetermined correlation value, it can be assumed that the compared characteristic values are the characteristic values of the same letter, but the text on the letter has been altered in the meantime.

The processor 211 causes a corresponding response to the requesting apparatus 100 (action 253).

The processor 111 of the apparatus 100 can analyze the result and can then react subject to said result (action 166). On the one hand, when there are identical characteristic values, the apparatus 100 can inform an administration unit, for example, that the letter has reached a particular location. On the other hand, when a change has been established, the apparatus 100 can request a courier, for example, to check the change.

Thus, in exemplary embodiments of the invention, it is possible to track the transportation course of packing units and to record changes in packing unit characteristics during the course of transportation. Damages or inscription changes can be identified and assessed. Changes in the inscription of a packing unit can be due to manipulation, for example, but also to address corrections, additions to service requirements or the like. A significant rationalization potential can be provided if, for example, an addition to service requirements by manual inscription can be detected automatically. The obtained information can also be used in an interaction with a customer, for example with the sender and/or the recipient.

The blocks 160-166 in FIG. 2 can also be understood as an illustration of functional modules of an exemplary embodiment of a computer program according to the invention.

The apparatus 100 from FIG. 1 can be modified in many different ways, both by omitting components and by adding components. This can provide further or alternative advantages. In another exemplary embodiment, the apparatus 100 instead of processor 111 and memory 112 with computer program 113 could comprise a circuit in which appropriate functions are implemented in terms of hardware. Instead of the apparatus 100, the IC 110 or a functionally corresponding circuit could also be considered as an exemplary embodiment of an apparatus according to the invention.

Figure 3:
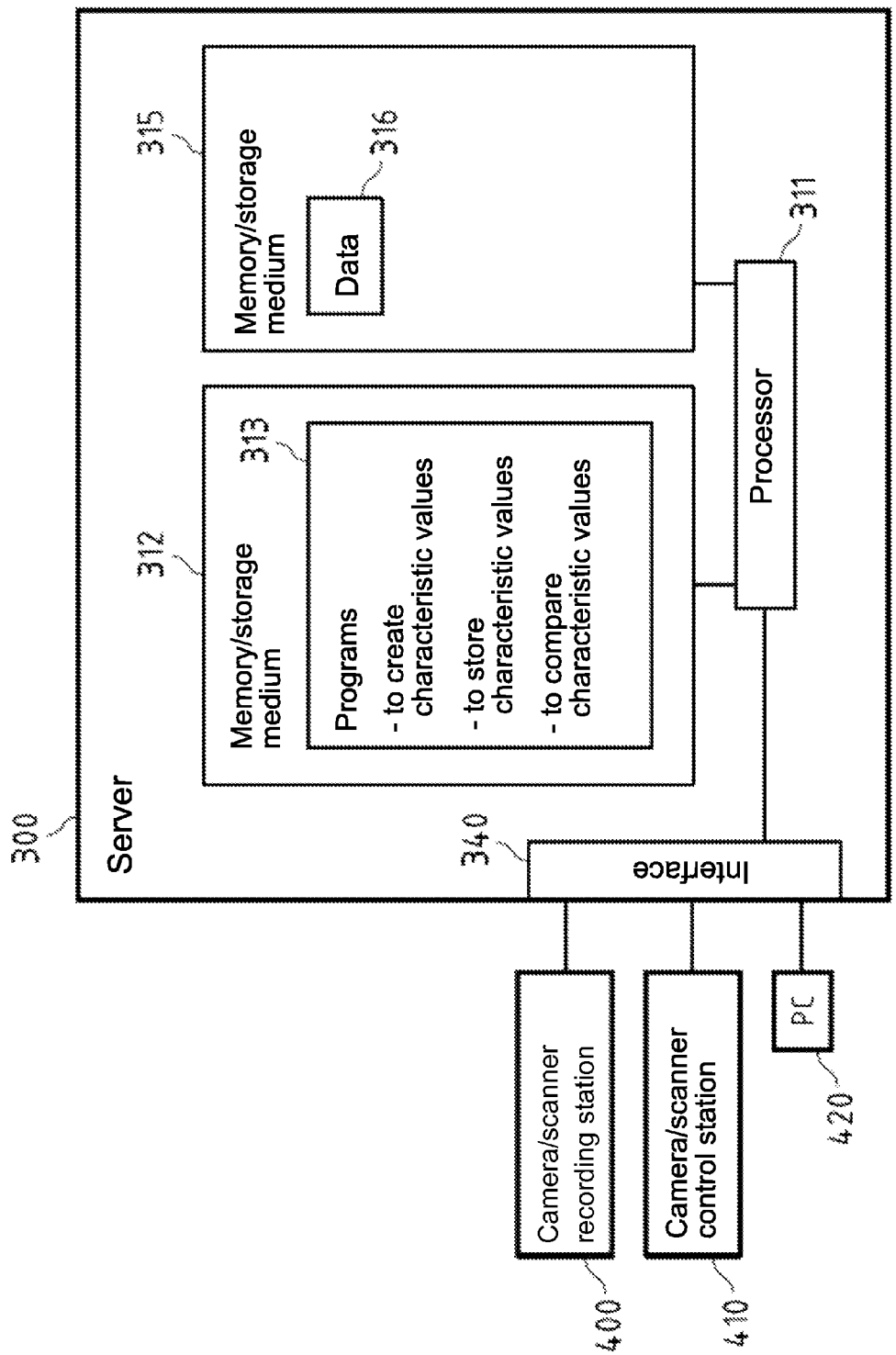
FIG. 3 is a block diagram of a second exemplary embodiment of a system according to the invention with a second exemplary embodiment of an apparatus according to the invention.
Figure 4:
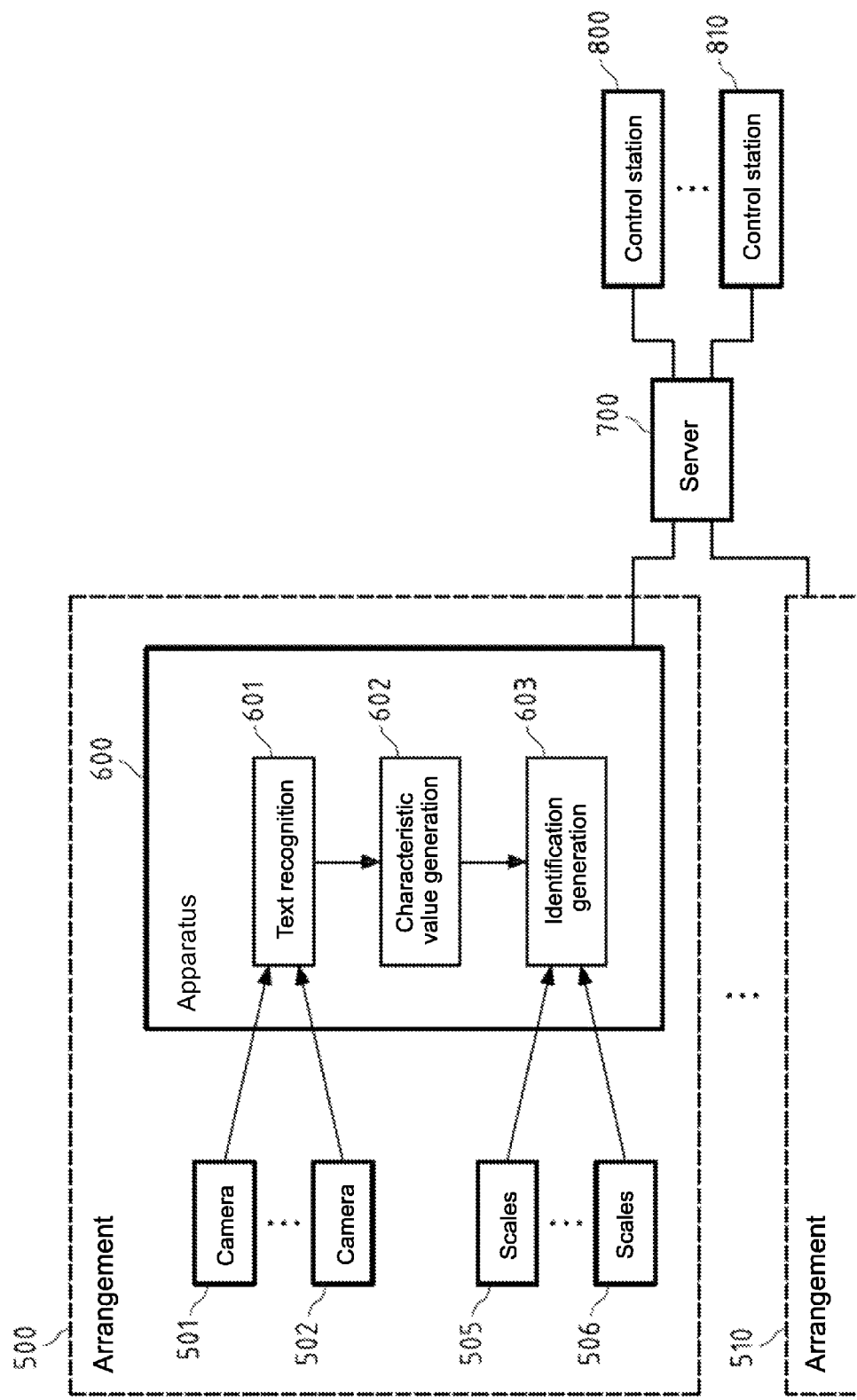
FIG. 4 is a block diagram of a third exemplary embodiment of a system according to the invention with a third exemplary embodiment of an apparatus according to the invention.

The entire system, presented in FIG. 1, can also be modified in many different ways. FIGS. 3 and 4 present two exemplary variations of the system.

FIG. 3 is a block diagram of a second exemplary embodiment of a system according to the invention.

The system comprises a server 300 as an exemplary embodiment of an apparatus according to the invention. The system further comprises a plurality of digital cameras or scanners 400, 410 and a computer (PC) 420 which are directly connected to the server 300 or are connected thereto by at least one data network.

The server 300 comprises a processor 311 and, connected to the processor 311, a first memory 312, a second memory 315 and an interface 340. The first memory 312 is or comprises a storage medium which stores programs with program instructions. The processor 311 is configured to execute programs from the program memory 312 and to thereby cause the server 300 to perform particular actions. The programs include programs 313 for determining characteristic values for packing units, for storing determined characteristic values of packing units and for comparing determined characteristic values with stored characteristic values. The second memory 315 is or comprises a storage medium which stores characteristic values for packing units and optionally further data, in particular further data associated with particular packing units. The processor 311 could be a central processor (central processing unit CPU). It could also be embedded in an integrated circuit, for example together with the first memory 312. The interface 340 allows data to be exchanged with other entities.

In addition to conventional components for recording images, the cameras 400, 410 have an interface for a data communication with the server 300. Some of the cameras 400 can belong to a respective recording station and may only be used for a first determination of characteristic values for packing units. Other cameras 410 can belong to a respective control station and may newly generate characteristic values for packing units at the control station so that they can be compared with stored characteristic values. However, some cameras could be provided for both purposes.

The computer 420 also has an interface for a data communication with the server 300. The computer 420 allows access to data in the server 300 and/or an automatic receipt of data from the server 300.

An operation of the system from FIG. 3 can substantially correspond to the operation, shown in FIG. 2, of the system from FIG. 1. However, in this case, the image data of the cameras 400, 410 are transmitted directly to a server 300, and the server 300 also takes over tasks of the apparatus 100 from FIG. 1.

When the server 300 receives image data from a camera 400 of a recording station, the processor 311 causes the server 300 to perform actions corresponding to actions 160-164 and 250 from FIG. 2. Only the transfer/receipt in actions 164 and 250 are omitted, since all the actions are carried out in one unit, i.e. in the server 300.

When the server 300 receives image data from a camera 410 of a control station, the processor 311 causes the server 300 to perform actions corresponding to actions 160-163, 165 and 251-253 from FIG. 2. In this case, the transfer/receipt in actions 165 and 251 are omitted. Furthermore, the results in action 253 could be sent automatically to the computer 420. However, the results could optionally also be transmitted to the camera 410 if this camera is configured to evaluate the results.

If the camera 410 also delivers current coordinates or an identification of a fixed control station to the server 300, the server could also store and provide the coordinates or the identification of the control station as the current position of the packing unit.

Particular control stations could also be configured to request, with the transmission of the image data, corresponding characteristic values to be deleted in the data memory 315 or to mark them as completed, for example following input from a courier, when a packing unit has been delivered. Characteristic values marked in this way no longer need to be considered during future correlations according to action 252.

The computer 420 could also be implemented such that it allows a user to call up data from server 300, for example to establish how many sets of characteristics are presently active. In this respect, a set of characteristics can be considered as being active as long as the corresponding packing unit is in the area of responsibility of a logistics company.

FIG. 4 is a block diagram of a third exemplary embodiment of a system according to the invention.

The system comprises a plurality of arrangements 500, 510, for example sorting installations, a server 700 and a plurality of control stations 800, 810.

The server 700 comprises a memory for storing identifications of packing units. The server 700 can be connected to the arrangements 500, 510 and to the control stations 800, 810 to exchange data.

Each of the arrangements 500 comprises a plurality of cameras 501, 502 and a plurality of other recording units 505, 506, for example scales. Each of the arrangements 500 also comprises an exemplary embodiment of an apparatus 600 according to the invention. Each of the cameras 501, 502 can optically record packing units and can forward the image data to the apparatus 600. Each of the further recording units 505, 506 can record further information about the packing units, for example the weight, and can forward the information to the apparatus 600. The plurality of cameras 501, 502 and of other recording units 505, 506 can be provided, for example to be able to process a large number of packing units and/or to be able to process different types of packing units separately and/or to be able to separately process packing units of different origins, etc.

The apparatus 600 comprises means for text recognition 601, means for characteristic value generation 602 and means for identification generation 603. The means for text recognition 601 receive image data from the cameras 501, 502 and extract individual characters from the data for a respective packing unit. The means for characteristic value generation 602 determine characteristic values based on statistical analyses of the characters for a respective packing unit. The means for identification generation 603 on the one hand receive characteristic values for a particular packing unit from the means 602 and on the other hand they receive further information about this packing unit from at least one further recording unit 505, 506. The means for identification generation 603 join together the acquired information into an identification for the packing unit. The identification for a respective packing unit is transmitted to the server 700 which stores the identification. The server 700 also receives and stores corresponding identifications from other arrangements 510. The transmission to the server 700 can contain a request to store the identification. Alternatively, for example an identifier of the apparatus 600 can be transmitted, using which the server 700 can deduce that the identification is to be stored.

The control stations 800, 810 can be stationary or mobile. Each of the control stations 800, 810 comprises a camera, at least one further recording unit for recording further information about a packing unit, means for text recognition, means for characteristic values generation and means for identification generation. A control station 800, 810 generates an identification for a respective packing unit similarly to the apparatus 100 and transmits the identification to the server 700. In this case, the identification is transmitted together with a request for comparison. Alternatively, for example an identifier of the control station 800, 810 can be transmitted, using which the server 700 can automatically deduce that a comparison of a transmitted identification is to be carried out. The server 700 then compares the received identification with the stored identifications and informs the control station 800, 801 or another predetermined unit of the result. The possible results can be again that no match was found, that an identical identification was found or that a similar identification was found which indicates a modification of a packing unit.

An identification of packing units based on statistical analyses is not only considered as an alternative to an identification using a barcode, but also as an addition to an identification using a barcode or another independent identification. In an exemplary embodiment, the characteristic values based on statistical analyses could be used in parallel with another identification. In a further exemplary embodiment, the characteristic values based on statistical analyses could be mainly used to establish changes in the inscription on a packing unit. In these cases, a set of characteristic values could be respectively stored together with a barcode value or with another identification.

The illustrated or described connections between components are to be understood as functional connections in all the embodiments. They can be realized directly or indirectly via a plurality of other components. They can be wired and/or wireless. They can be permanently present or set up when required in each case. The sequence of illustrated actions is not compulsory; alternative sequences of the method steps are possible. The actions can be implemented in different ways; thus an implementation is not only possible in software (through program instructions) but also only in hardware or in a combination of the two.

It is understood that the described embodiments are merely examples which can be modified and/or supplemented in many different ways within the scope of the claims. In particular, every feature which has been described for a particular embodiment can be used independently or combined with other features in any other embodiment. Every feature which has been described for an embodiment of a particular category can also be used correspondingly in an embodiment of another category.

The invention claimed is:

1. A method performed by at least one apparatus, the method comprising:
    obtaining data resulting from an optical recording of at least one surface of a packing unit;
    carrying out a text recognition based on the obtained data for recognizing individual characters;
    determining a plurality of characteristic values, wherein each characteristic value is a statistical value that is based on another predetermined statistical analysis of the recognized characters;
    providing the characteristic values as at least one part of an identification of the packing unit for comparison with previously stored characteristic values for the packing unit, wherein the result of the comparison is used for tracking the packing unit; and
    comparing the determined characteristic values with characteristic values previously determined and stored for packing units to establish differences; and:
    determining in the case of differences falling short of a predetermined threshold that the particular packing unit has been processed before for reasons of tracking and providing an indication that the particular packing unit has now reached a particular location; and/or
    determining in the case of differences falling short of a predetermined first threshold and exceeding a predetermined. second threshold that the particular packing unit has been processed before for reasons of tracking and that text on the particular packing unit has been altered in the meantime, and providing a corresponding indication.

2. The method according to claim 1, wherein at least one of the statistical analyses comprises at least one of the following:
   determining a frequency of a particular character;
   determining a frequency of a particular combination of characters; and
   determining a frequency of a particular character at a particular position.

3. The method according to claim 1, wherein the predetermined statistical analyses of the recognized characters are selected based on at least one of the following probabilities:
   a probability of occurrence of a particular character;
   a probability of occurrence of a particular combination of characters; and
   a probability of occurrence of a particular character at a particular position.

4. The method according to claim 1, wherein different statistical analyses of recognized characters are predetermined for at least one of different languages and different language groups, wherein the predetermined statistical analyses of the recognized characters for a respective language or language group are based on statistical analyses of the language or language group and wherein the plurality of characteristic values are determined based in each case on statistical analyses of the recognized characters which have been predetermined for a language or language group.

5. The method according to claim 4, wherein the language or language group is determined based on at least one of:
   a geometric distribution of particular recognized characters;
   a presence of a particular character; and
   information about the place of origin of the packing unit.

6. The method according to claim 1, further comprising the optical recording of the at least one surface of the packing unit.

7. The method according to claim 1, wherein the optical recoding comprises one of
   scanning the at least one surface of the packing unit; and
   photographing the at least one surface of the packing unit.

8. The method according to claim 1, further comprising comparing the determined characteristic values with characteristic values previously determined and stored for packing units by correlating the determined characteristic values with stored characteristic values to establish at least one of a match and differences.

9. An apparatus comprising at least one processor, at least one memory and a program comprising program instructions stored in the memory, the at least one memory and the program being configured, with the at least one processor to cause the apparatus at least to perform the following when the program is executed on the at least one processor:
   obtain data resulting from an optical recording of at least one surface of a packing unit;
   carry out a text recognition based on the obtained data for recognizing individual characters;
   determine a plurality of characteristic values, wherein each characteristic value is a statistical value that is based on another predetermined statistical analysis of the recognized characters;
   provide the characteristic values as at least one part of an identification of the packing unit for and comparison with previously stored characteristic values for the packing unit, wherein the result of the comparison is used for tracking the packing unit; and
   compare the determined characteristic values with characteristic values previously determined and stored for packing units to establish differences; and:
   determine in the case of differences falling short of a predetermined threshold that the particular packing unit has been processed before for reasons of tracking and providing an indication that the particular packing unit has now reached a particular location; and/or
   determine in the case of differences falling short of a predetermined first threshold and exceeding a predetermined second threshold that the particular packing unit has been processed before for reasons of tracking and that text on the particular packing unit has been altered in the meantime, and providing a corresponding indication.

10. The apparatus according to claim 9, wherein at least one of the statistical analyses comprises at least one of the following:
    determining a frequency of a particular character;
    determining a frequency of a particular combination of characters; and
    determining a frequency of a particular character at a particular position.

11. The apparatus according to claim 9, wherein the predetermined statistical analyses of the recognized characters are selected based on at least one of the following probabilities:
    a probability of occurrence of a particular character;
    a probability of occurrence of a particular combination of characters; and
    a probability of occurrence of a particular character at a particular position.

12. The apparatus according to claim 9, wherein different statistical analyses of recognized characters are predetermined for at least one of different languages and language groups, wherein the predetermined statistical analyses of the recognized characters for a respective language or language group are based on statistical analyses of the language or language group and wherein the plurality of characteristic values are determined based in each case on statistical analyses of the recognized characters which have been predetermined for a language or language group.

13. The apparatus according to claim 12, wherein the at least one memory and the program are further configured, with the at least one processor to cause the apparatus to determine the language or language group based on at least one of:
    a geometric distribution of particular recognized characters;
    a presence of a particular character; and
    information about the place of origin of the packing unit.

14. The apparatus according to claim 9, further configured to perform the optical recording of the at least one surface of the packing unit.

15. The apparatus according to claim 9, further comprising at least one of:
    a scanner configured to perform the optical recording by scanning the at least one surface of the packing unit; and
    a camera configured to perform the optical recording by photographing the at least one surface of the packing unit.

16. The apparatus according to claim 9, wherein the at least one memory and the program are further configured, with the at least one processor to cause the apparatus to compare the determined characteristic values with characteristic values previously determined and stored for packing units by correlating the determined characteristic values with stored characteristic values to establish at least one of a match and differences.

17. The apparatus according to claim 9 which further comprises at least one of the following components:
- an interface for data communication;
- a scanner; and
- a camera.

18. A system comprising at least one apparatus according to claim 9 and at least one of
- at least one scanner for optically recording a surface of packing units; and
- at least one camera for optically recording a surface of packing units.

19. A non-transitory storage medium, in which a program comprising program instructions is stored, wherein the program instructions, when executed by a processor, cause an apparatus to perform the following:
- obtain data resulting from an optical recording of at least one surface of a packing unit;
- carry out a text recognition based on the obtained data for recognizing individual characters;
- determine a plurality of characteristic values, wherein each characteristic value is a statistical value that is based on another predetermined statistical analysis of the recognized characters; and
- provide the characteristic values as at least one part of an identification of the packing unit for comparison with previously stored characteristic values for the packing unit, wherein the result of the comparison is used for tracking the packing unit; and
- compare the determined characteristic values with characteristic values previously determined and stored for packing units to establish differences; and:
- determine in the case of differences falling short of a predetermined threshold that the particular packing unit has been processed before for reasons of tracking and providing an indication that the particular packing unit has now reached a particular location; and/or
- determine in the case of differences falling short of a predetermined first threshold and exceeding a predetermined second threshold that the particular packing unit has been processed before for reasons of tracking and that text on the particular packing unit has been altered in the meantime, and providing a corresponding indication.

\* \* \* \* \*

UNITED STATES PATENT AND TRADEMARK OFFICE
CERTIFICATE OF CORRECTION

PATENT NO. : 9,858,505 B2
APPLICATION NO. : 14/804971
DATED : January 2, 2018
INVENTOR(S) : Bernd Hartmann Page 1 of 1

It is certified that error appears in the above-identified patent and that said Letters Patent is hereby corrected as shown below:

Column 12, Claim 1, Line 63, after termined delete ".".

Signed and Sealed this
Tenth Day of April, 2018

Andrei Iancu
*Director of the United States Patent and Trademark Office*